(12) United States Patent
Kinoshita

(10) Patent No.: US 8,786,751 B2
(45) Date of Patent: Jul. 22, 2014

(54) DISPLAY CONTROL SYSTEM, DISPLAY CONTROL APPARATUS AND CONTROL METHOD THEREFOR

(75) Inventor: Yuichi Kinoshita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/552,114

(22) Filed: Jul. 18, 2012

(65) Prior Publication Data

US 2013/0027570 A1    Jan. 31, 2013

(30) Foreign Application Priority Data

Jul. 29, 2011  (JP) ................. 2011-167440

(51) Int. Cl.
*H04N 5/222*   (2006.01)
(52) U.S. Cl.
USPC ..................................... 348/333.02
(58) Field of Classification Search
CPC ... H04N 5/772; H04N 5/23293; H04N 5/232; H04N 2101/00
USPC ............ 348/65, 73, 83–85, 211.1, 211.8, 348/211.13, 211.14, 333.02, 333.03, 348/333.06, 333.07, 333.12, 333.01
See application file for complete search history.

(56) References Cited

U.S. PATENT DOCUMENTS

| | | | |
|---|---|---|---|
| 7,893,963 B2* | 2/2011 | Gallagher et al. | 348/208.6 |
| 8,089,549 B2* | 1/2012 | Yasuda et al. | 348/333.02 |
| 2005/0117024 A1* | 6/2005 | Lee | 348/208.15 |
| 2008/0204566 A1* | 8/2008 | Yamazaki et al. | 348/208.99 |
| 2009/0080874 A1* | 3/2009 | Ikehata et al. | 396/50 |
| 2011/0242394 A1* | 10/2011 | Ohdate | 348/333.02 |

FOREIGN PATENT DOCUMENTS

| | | |
|---|---|---|
| JP | 2002-271654 | 9/2002 |
| JP | 2011-049661 | 3/2011 |

* cited by examiner

*Primary Examiner* — Aung S Moe
*Assistant Examiner* — Chriss Yoder, III
(74) *Attorney, Agent, or Firm* — Cowan, Liebowitz & Latman, P.C.

(57) ABSTRACT

A display control apparatus having a connecting portion communicably connected to an imaging apparatus obtains an inclination angle of the imaging apparatus, and displays a displayed item on a display unit based on the obtained inclination angle. At this time, the display control apparatus performs control for displaying the displayed item indicating an inclination angle whose positive and negative have been inverted relative to positive and negative of the obtained inclination angle.

17 Claims, 8 Drawing Sheets

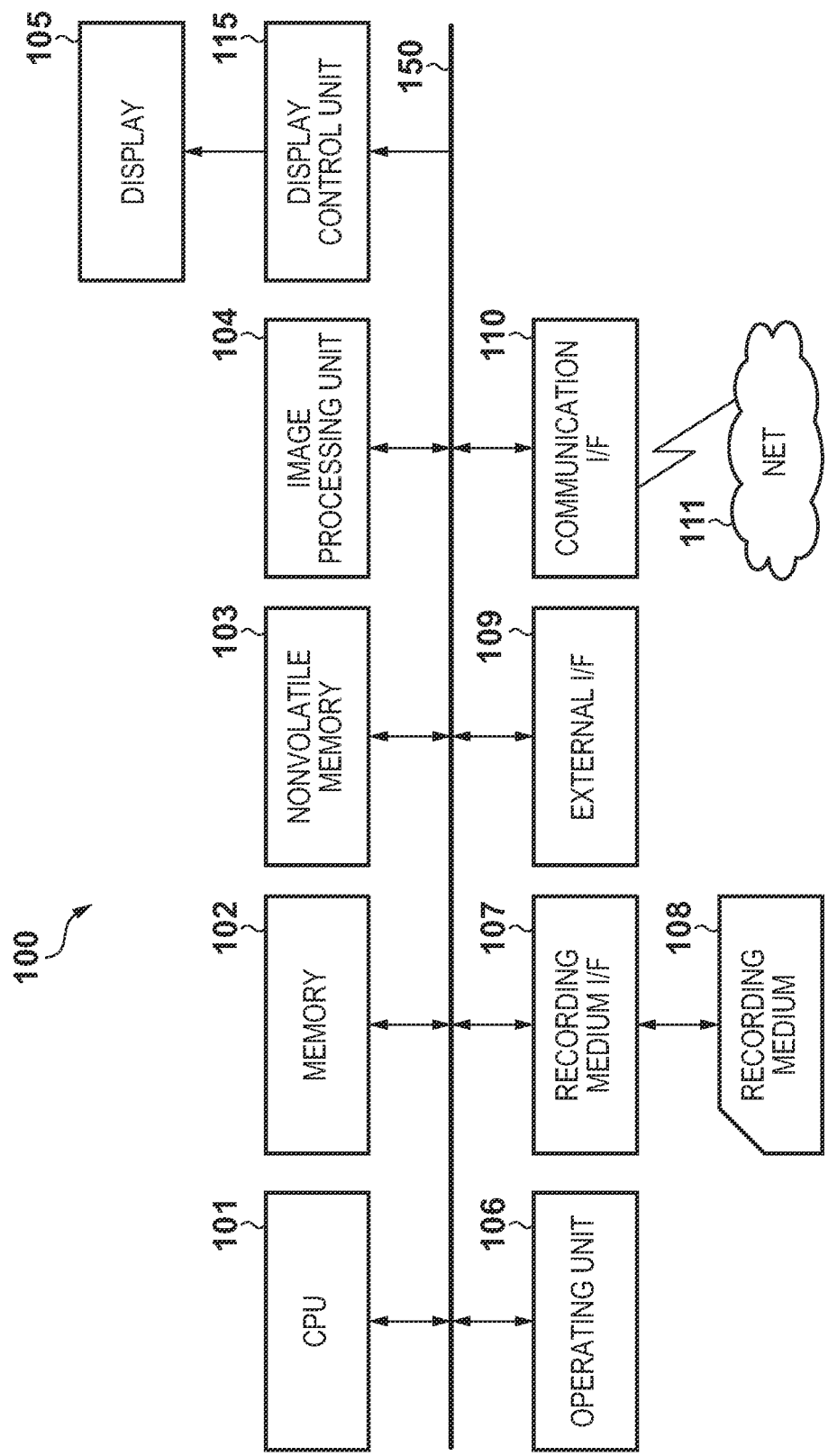

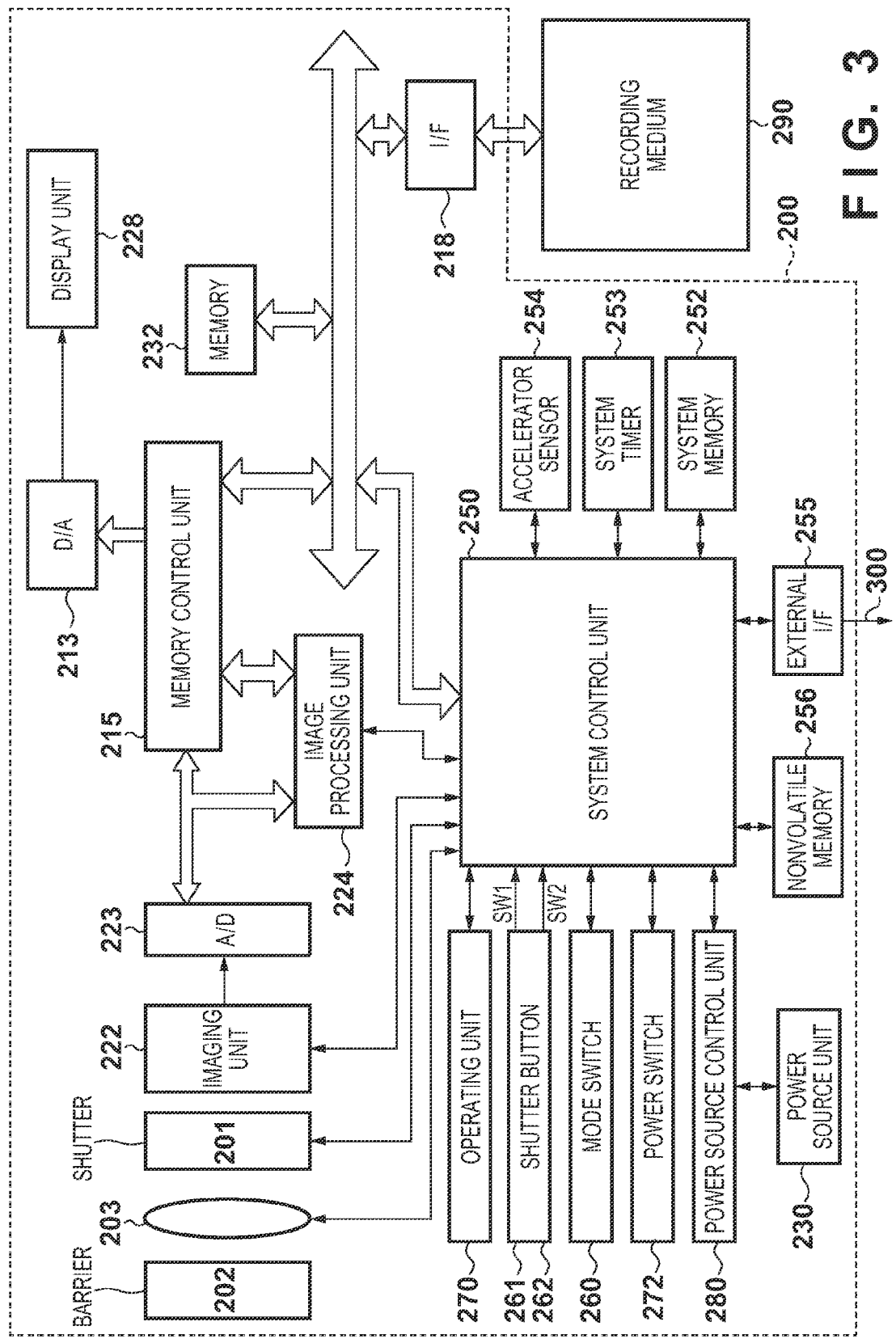

F I G. 4A
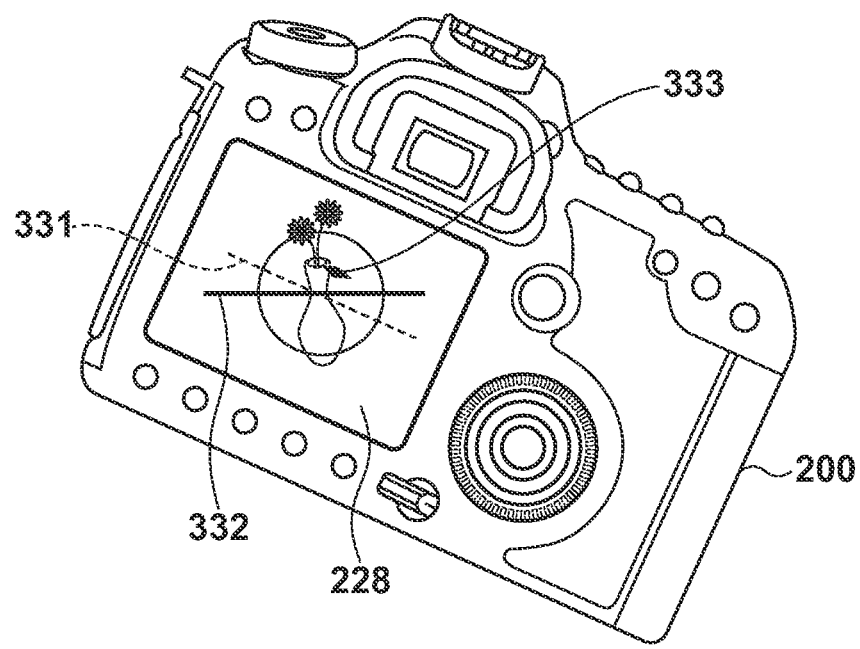
F I G. 4B
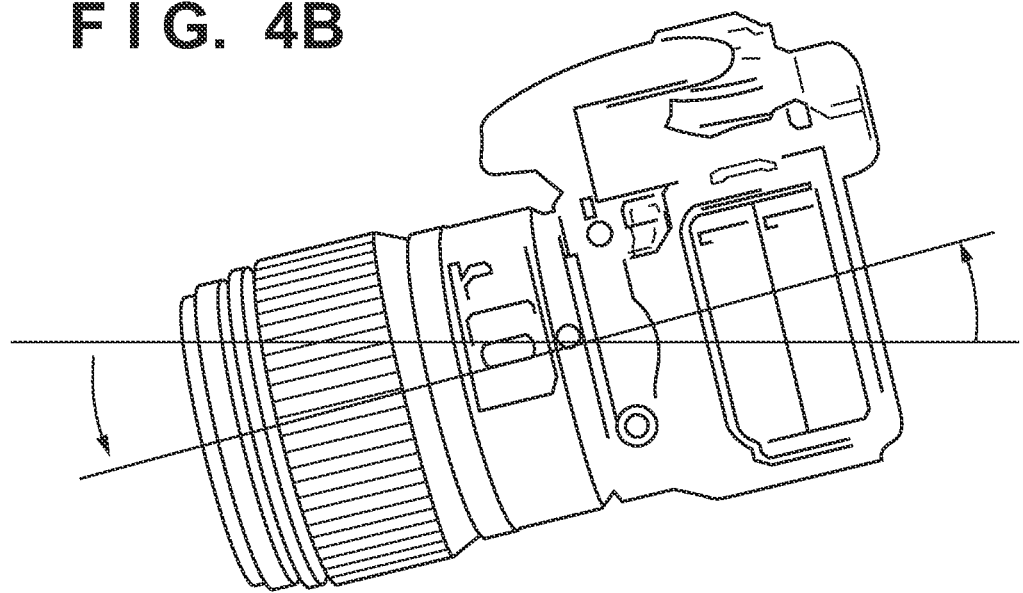

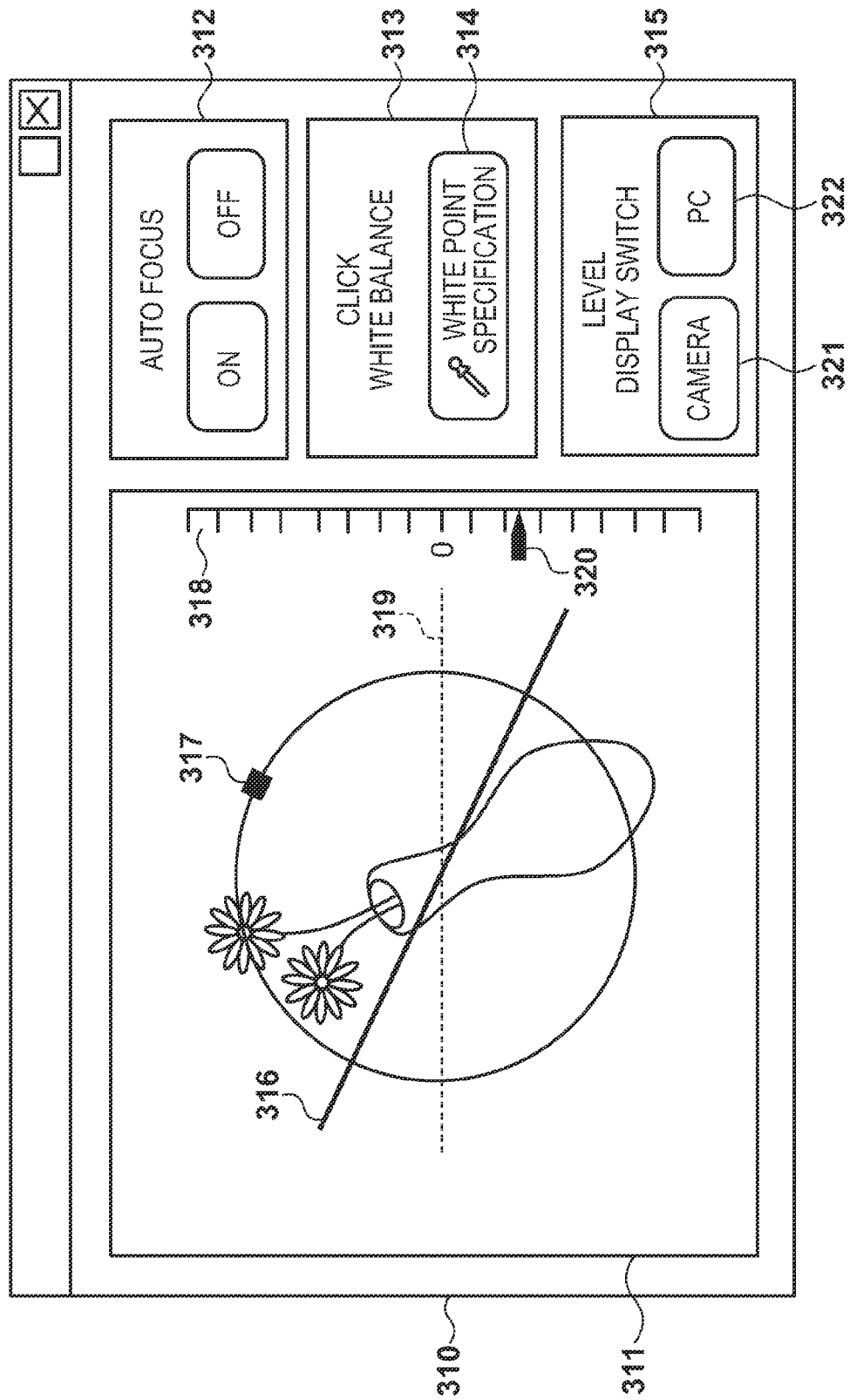

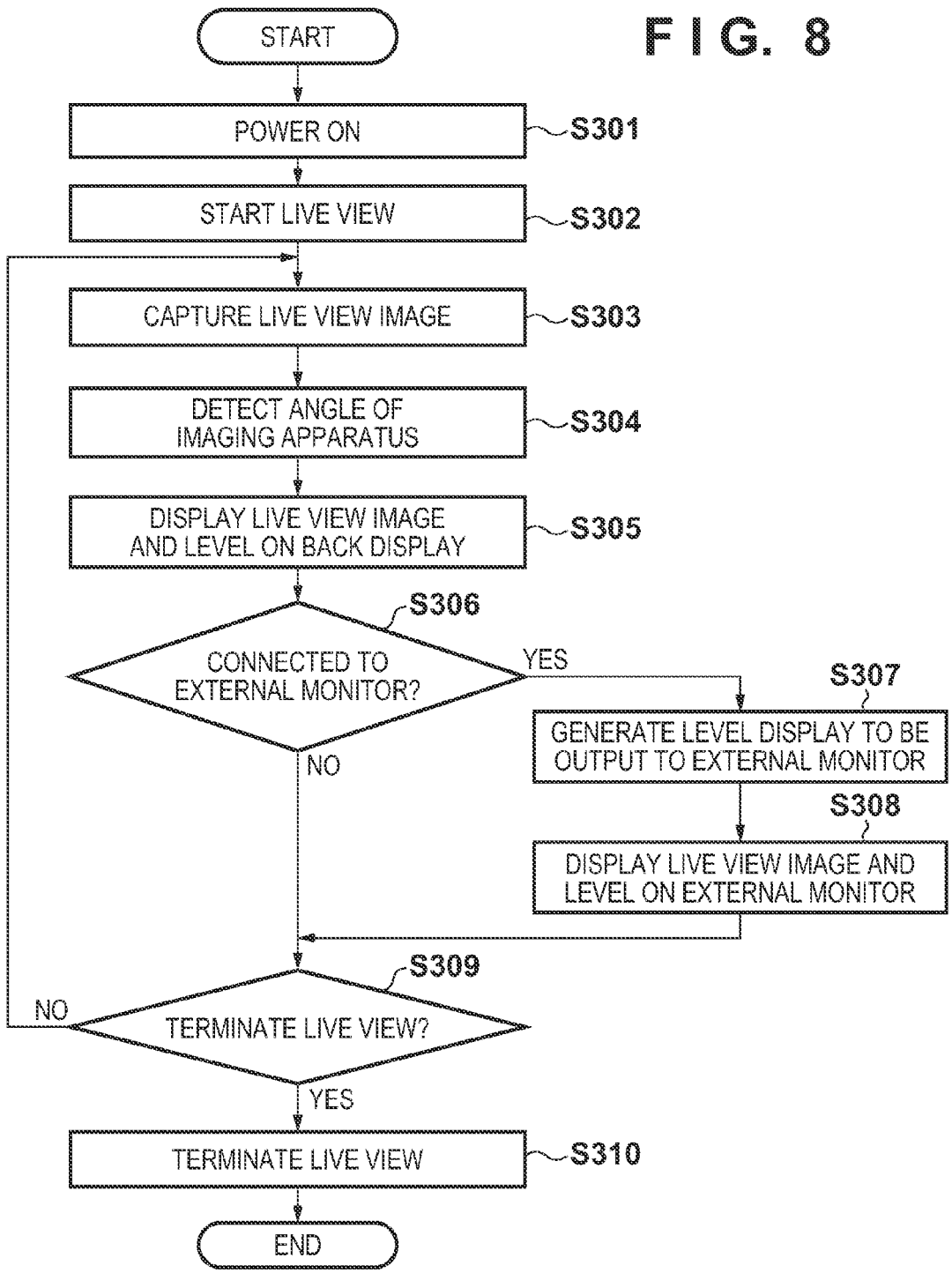

DISPLAY CONTROL SYSTEM, DISPLAY CONTROL APPARATUS AND CONTROL METHOD THEREFOR

BACKGROUND OF THE INVENTION

1. Field of the Invention

The present invention relates to a display control system, display control apparatus for performing display on an external monitor connected to an imaging apparatus based on attitude information on the imaging apparatus obtained from the imaging apparatus, a control method for the same, a recording medium.

2. Description of the Related Art

A level indicating an inclination of an imaging apparatus is displayed on a back display of the imaging apparatus. Japanese Patent Laid-Open No. 2002-271654 (hereinafter, Literature 1) discloses that a line parallel to a left-right direction of an imaging apparatus is fixedly displayed as a horizontal reference line in the center of a back monitor screen of the imaging apparatus, and an auxiliary horizontal shooting line is also displayed (level display) in accordance with an inclination angle of the imaging apparatus detected by an attitude detector. With such level display, to a user viewing the back monitor of the imaging apparatus in a fixed position with respect to gravity, a gravity reference line (the auxiliary horizontal shooting line in Literature 1) that rotates in an opposite direction to the inclination of the imaging apparatus appears relatively to be not moving. This is because the gravity reference line rotates with respect to the back monitor but is fixed with respect to gravity. Therefore, the user can horizontally hold the imaging apparatus by adjusting the attitude of the imaging apparatus such that the line (the horizontal reference line) fixedly displayed in the left-right direction of the imaging apparatus is aligned with the gravity reference line (the auxiliary horizontal shooting line) that appears stationary to a user regardless of the inclination of the imaging apparatus.

Meanwhile, a method (remote live view capturing) for connecting an imaging apparatus to a computer, which is an external device, and displaying, on the computer display (an external monitor), live view displayed on a back display screen of the imaging apparatus (Japanese Patent Laid-Open No. 2011-049661 (hereinafter, Literature 2)). With this configuration, a user can take pictures while viewing the display on the external monitor.

The case where a level is displayed in a conventional manner as in Literature 1 using an external monitor fixedly installed regardless of the inclination of the imaging apparatus as in Literature 2 is now considered. In this case, to a user viewing the external monitor, the line displayed in a manner fixed to the left-right direction of the imaging apparatus seems to be not relatively moving, while the displayed gravity reference line that rotates in the opposite direction to the inclination of the imaging apparatus appears to be moving. Moreover, the gravity reference line seems to be moving in the opposite direction to the inclination of the imaging apparatus. Therefore, a problem arises in that when manipulating the inclination of the imaging apparatus while referring to the gravity reference line displayed on the external monitor, the photographer has trouble adjusting the attitude of the imaging apparatus as intended.

SUMMARY OF THE INVENTION

The present invention was made in consideration of the foregoing problem, and according to an embodiment of the present invention, a display method with which when display related to an inclination of an imaging apparatus is shown on an external monitor, a viewer of the external monitor can easily adjust the attitude of the imaging apparatus as intended is provided.

According to one aspect of the present invention, there is provided a system in which an imaging apparatus is connected to a display control apparatus that controls an external display unit, the imaging apparatus comprising: a detection unit configured to detect an inclination of the imaging apparatus; a display unit configured to display an image captured by the imaging apparatus; and a first display control unit configured to cause a reference line indicating a horizontal or vertical direction to be displayed together with the image displayed on the display unit, the first display control unit causing the reference line rotated in accordance with information on the inclination of the imaging apparatus detected by the detection unit to be displayed, the display control apparatus comprising: an obtaining unit configured to obtain the information on the inclination of the imaging apparatus and the image captured by the imaging apparatus; and a second display control unit configured to cause the reference line rotated in accordance with the information on the inclination of the imaging apparatus to be displayed on the external display unit together with the image captured by the imaging apparatus, wherein the second display control unit causes the reference line to be displayed so as to be rotated in an opposite direction to a rotational direction of the reference line caused to be displayed by the first display control unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing an exemplary configuration of a personal computer (PC).

FIG. 3 is a block diagram showing an exemplary configuration of a digital camera.

FIG. 4A and FIG. 4B are diagrams showing an exemplary display of level display on a display screen of the digital camera and an example of an inclination of the digital camera, respectively.

FIG. 5 is a diagram showing an exemplary display of a remote live view screen.

FIG. 8 is a flowchart showing a control procedure of the digital camera according to the second embodiment.

DESCRIPTION OF THE EMBODIMENTS

Preferred embodiments of the present invention will be hereinafter described in detail with reference to the accompanying drawings.

First Embodiment

Example of the System Configuration

Figure 1:
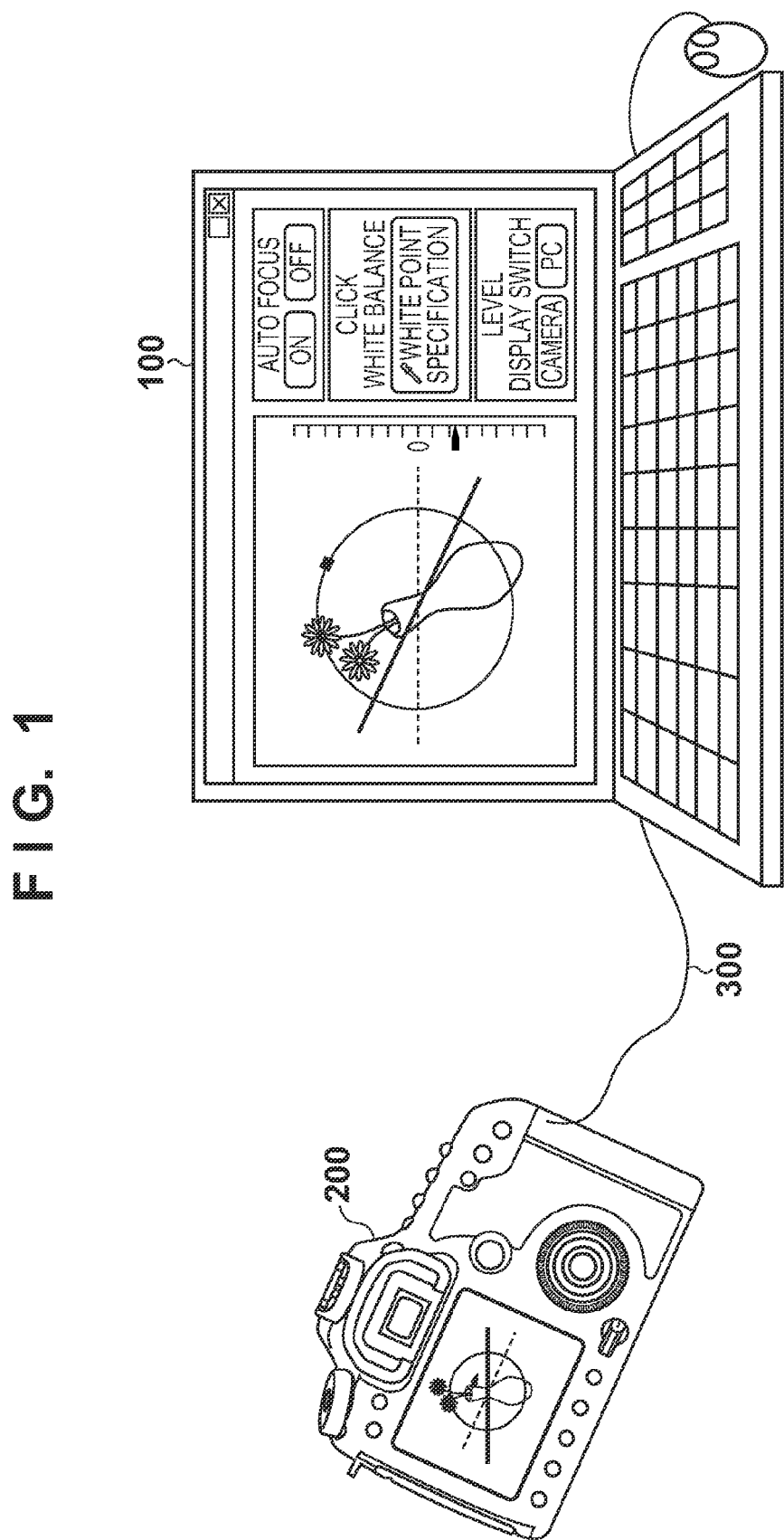
FIG. 1 is a diagram showing an exemplary system configuration in the first embodiment.

FIG. 1 is a diagram showing a system configuration according to the first embodiment. Reference numeral 100 denotes a personal computer (hereinafter, PC) serving as an information processing apparatus, and reference numeral 200 denotes a digital camera serving as an imaging apparatus. The PC 100 functions as a display control apparatus for controlling an external display. The PC 100 and the digital camera 200 are communicably connected to each other via a cable 300, and a live view image displayed on a display unit on the back of the digital camera 200 is displayed on a screen of the PC 100 substantially in real time. Note that although in the present embodiment the PC 100 and the digital camera 200 are connected with the cable 300, the PC 100 and the digital camera 200 may alternatively be connected wirelessly or in another manner. Further, although the PC 100 is used as an external device connected to the digital camera 200 in the above-described example, the external device is not limited thereto. For example, any information processing apparatuses capable of implementing the functions described below, such as a tablet terminal, may be used as the external device.

Configuration of the PC 100

The block diagram of FIG. 2 shows an example of an internal configuration of the PC 100 serving as an external device connectable to the digital camera 200. In the PC 100, a CPU 101, a memory 102, a nonvolatile memory 103, an image processing unit 104, a display control unit 115, an operating unit 106, a recording medium I/F 107, an external I/F 109 and a communication I/F 110 are connected to an internal bus 150. The components connected to the internal bus 150 are able to exchange data via the internal bus 150.

The CPU 101 uses the memory 102 as a work memory and controls each component of the PC 100 in accordance with a program stored in the nonvolatile memory 103, for example. The memory 102 is a RAM (a volatile memory using a semiconductor device, or the like), for example. Image data, audio data, other kinds of data, various programs necessary for the CPU 101 to operate, and the like are stored in the nonvolatile memory 103. The nonvolatile memory 103 includes a hard disk (HD), a ROM or the like, for example.

The image processing unit 104 performs, based on the control of the CPU 101, various kinds of image processing on image data stored in the nonvolatile memory 103 and a recording medium 108, image signals obtained via the external I/F 109, image data obtained via the communication I/F 110 and the like. Image processing performed by the image processing unit 104 includes A/D conversion processing, D/A conversion processing, image data encoding processing, compression processing, decoding processing, scaling processing (resizing), noise reduction processing, color conversion processing and the like. The image processing unit 104 may be constituted by a dedicated circuit block for performing specific image processing. Further, depending on the type of image processing, the CPU 101 can perform image processing in accordance with programs without using the image processing unit 104.

A display 105 displays, based on the control of the CPU 101, images formed from video data and image data, a GUI screen that constitutes a GUI (Graphical User Interface) and the like. The CPU 101 generates a display control signal in accordance with a program, and performs control such that the display control unit 115 generates and outputs an image signal for performing display on the display 105. The display 105 displays a picture based on the image signal output by the display control unit 115. Note that the components up to the interface (the display control unit 115) for outputting the image signal for performing display on the display 105 are included in the PC 100, and the display 105 may be an external monitor (such as a television).

The operating unit 106 is an input device for accepting user operations including a character information input device such as a keyboard, a pointing device such as a mouse and a touch panel, a button, a dial, a joystick, a touch sensor, a touch pad and the like. Note that a touch panel refers to an input device that is two-dimensionally configured and superposed on the display 105, and allows coordinate information corresponding to a touched position to be output.

The recording medium I/F 107 is capable of having a recording medium 108 such as a memory card, a CD or a DVD loaded therein, and reads data from the loaded recording medium 108 and writes data on the recording medium 108 based on the control of the CPU 101. The external I/F 109 is an interface for connecting to external devices with a cable or wirelessly, and for inputting and outputting image signals and audio signals. The PC 100 in the present embodiment can be connected to the digital camera 200 via this external I/F 109 and the cable 300. The communication I/F 110 is an interface for communicating with external devices, the Internet 111 and the like, and transmitting and receiving various kinds of data such as files and commands.

Configuration of the Digital Camera 200

FIG. 3 is a block diagram showing an example of a configuration of the digital camera 200 in the present embodiment. In FIG. 3, an imaging lens 203 is a lens group including a zoom lens and a focus lens. A shutter 201 is a shutter having a diaphragm function. An imaging unit 222 is an image sensor such as a CCD and a CMOS device for converting an optical image into an electric signal. An A/D converter 223 is used for converting an analog signal output by the imaging unit 222 into a digital signal. A barrier 202 covers an imaging system including the imaging lens 203 in the digital camera 200, thereby protecting the imaging system including the imaging lens 203, the shutter 201 and the imaging unit 222 from contamination and breakage.

An image processing unit 224 performs predetermined resizing processing, such as pixel interpolation and contraction, and color conversion processing on data from the A/D converter 223 or data from a memory control unit 215. The image processing unit 224 also performs predetermined processing using captured image data, and the system control unit 250 performs exposure control and distance measurement control based on the obtained processing result. Thus, TTL (Through-The-Lens) AF (Auto Focus) processing, AE (Auto Exposure) processing and EF (pre-flash emission) processing are performed. The image processing unit 224 further performs predetermined processing using captured image data, and also performs TTL AWB (Auto White Balance) processing based on the obtained processing result.

Data output by the A/D converter 223 is directly written on a memory 232 via the image processing unit 224 and the memory control unit 215, or via the memory control unit 215. The memory 232 stores image data obtained by the imaging unit 222 and converted into digital data by the A/D converter 223 and image data to be displayed on the display unit 228. The memory 232 has a sufficient storage capacity to store a predetermined number of still images and a predetermined length of moving images and voice.

The memory 232 also works as a memory (a video memory) used for image display. A D/A converter 213 converts data for image display stored in the memory 232 into an analog signal and supplies the converted signal to the display unit 228. Thus the image data for display written on the memory 232 is displayed by the display unit 228 via the D/A converter 213. The display unit 228 performs display on a display device such as an LCD in accordance with the analog signal from the D/A converter 213. The display 228 also functions as an electronic view finder by means of a through-the-lens image display (live view display). In this case, the digital signals once A/D-converted by the A/D converter 223 and accumulated in the memory 232 are converted into analog signals by the D/A converter 213, and sequentially transferred to and displayed on the display unit 228.

A nonvolatile memory 256 is an electrically erasable and recordable memory, and an EEPROM or the like, for example, is used. Constants, programs and the like for operation of the system control unit 250 are stored in the nonvolatile memory 256. The programs mentioned here include programs for implementing various flowcharts described later in the present embodiment.

The system control unit 250 controls the entire digital camera 200. The system control unit 250 implements each processing described later in the present embodiment by executing the programs recorded on the above-mentioned nonvolatile memory 256. Generally a RAM is used as a system memory 252. In the system memory 252, the constants and variables for operation of the system control unit 250 are held, and the programs and the like read out from the nonvolatile memory 256 are expanded. The system control unit 250 also performs display control by controlling the memory 232, the D/A converter 213, the display unit 228 and the like.

A system timer 253 is a time measuring unit for measuring time used for various kinds of control and time of a built-in clock. A mode switch 260, a shutter button (a first shutter switch 261 and a second shutter switch 262) and an operating unit 270 are operating means for inputting various operation instructions to the system control unit 250.

The mode switch 260 switches an operation mode of the system control unit 250 to any one of a still image recording mode, a moving image recording mode and a reproducing mode. Modes included in the still image recording mode are an auto shoot mode, an auto scene recognition mode, a manual mode, various scene modes serving as shooting settings for each shooting scene, a program AE mode, a custom mode and the like. The operation mode can be directly switched to any one of those modes included in the still image recording mode with the mode switch 260. Alternatively, the operation mode may be once switched to the still image recording mode with the mode switch 260, and then switched to any one of those modes included in the still image recording mode using another operating member. Similarly, the moving image recording mode may also include a plurality of modes. The first shutter switch 261 is turned on by the shutter button provided to the digital camera 200 being partially operated, a so-called half-press (a shooting preparation instruction), and generates a first shutter switch signal SW1. In response to the first shutter switch signal SW1, operations such as AF (Auto Focus) processing, AE (Auto Exposure) processing, AWB (Auto White Balance) processing and EF (pre-flash emission) processing are started.

The second shutter switch 262 is turned on when the shutter button is completely pressed, a so-called full-press, (a shooting instruction), and generates a second shutter switch signal SW2. In response to the second shutter switch signal SW2, the system control unit 250 starts a series of operations of shooting processing covering from reading of a signal from the imaging unit 222 to writing of image data on the recording medium 290.

Operating members of the operating unit 270 are assigned with functions as appropriate for each scene by various function icons displayed on the display unit 228 being selected, or the like, and function as various function buttons. Examples of the function button include an exit button, a return button, an image forward button, a jump button, a filtering button, an attribute change button and the like. For example, when a menu button is pressed, a menu screen on which various settings can be configured is displayed on the display unit 228. A user is able to intuitively configure various settings using the menu screen displayed on the display unit 228, four-directional buttons operative in up-down and left-right directions and a SET button.

A power source control unit 280 includes a battery detection circuit, a DC-DC converter, a switch circuit for switching blocks to be energized and the like, and detects whether or not a battery is mounted, the battery type and the remaining battery charge. The power source control unit 280 also controls the DC-DC converter based on a detection result and an instruction from the system control unit 250, and supplies necessary voltage to the components including the recording medium 290 for a necessary time period. When a power switch 272 is turned on, the system control unit 250 instructs the power control unit 280 to supply electricity to the components.

A power source unit 230 consists of a primary battery such as an alkaline cell or a lithium cell, a secondary battery such as a NiCd cell, a NiMH cell and a Li cell, an AC adapter or the like. A recording medium I/F 218 is an interface for connection with the recording medium 290 such as a memory card and a hard disk. The recording medium 290 is a recording medium for recording captured images such as a memory card, and constituted by a semiconductor memory, a magnetic disk or the like.

An accelerator sensor 254 is a sensor for detecting an acceleration applied to the digital camera 200. The accelerator sensor 254 can detect the acceleration along three axes, namely the X, Y and Z axes, thereby recognizing yaw, roll and pitch of the digital camera 200 in the gravity direction. An attitude detection unit provided with the system control unit 250 detects a gravity acceleration (a gravity direction) using the accelerator sensor 254, and performs processing of detecting the attitude of the digital camera 200. Based on the detected attitude angle of the digital camera 200, an inclination angle with respect to a reference angle (0°), which is an angle in a reference attitude, can be displayed on the display unit 228 (a level display). This level display is used in the still image or moving image recording mode to horizontally adjust a composition or to determine a composition with respect to a horizontal position. The reference angle depends on the attitude of the digital camera 200. The system control unit 250 in the digital camera 200 sets the reference angle defined as 0° in the level based on which reference attitude of a normal position, a right vertical position, a left vertical position and an inverted position the attitude of the digital camera 200 is closest to as a result of the attitude detection.

An external I/F 255 is an interface for connection with external devices. The external I/F 255 is connectable to external devices through wired or wireless communication, and is capable of exchanging information (including video information and information from the accelerator sensor 254) with the external devices. Here, examples of wired communication include communication via a USB cable, a LAN cable, or an HDMI cable, and examples of wireless communication include communication using a wireless LAN, Bluetooth (trademark) and the like. The external I/F 255 may also be a video output terminal, and is thus capable of outputting live view images that are being captured by the imaging unit 222, pictures of reproduced images recorded on the recording medium 290, and GUI video such as various icons and information display, and displaying them on an external monitor. The same content as that displayed on the display unit 228 can also be output, and it is also possible to output video generated in a form suitable for the external monitor. Note that in the present embodiment, the above-mentioned PC 100 can be connected via this external I/F 255 and the cable 300.

Example of live view display in the digital camera 200

FIG. 4A shows an example of display of level display on the display screen of the display unit 228 in the digital camera 200. In the level display in the digital camera 200, a camera reference line 331 parallel to the left-right direction of the digital camera 200 is displayed, and a gravity reference line 332 based on the attitude of the digital camera 200 detected by the accelerator sensor 254 is also displayed. Note that the gravity reference line 332 is shown as a reference line in the horizontal direction indicating a direction perpendicular to gravity, but it may alternatively be a reference line in a vertical direction indicating a direction parallel to gravity. This also applies to the display on the PC 100 side described later. An elevation/depression angle mark 333 indicating an elevation angle or a depression angle based on angle information on the elevation angle or a depression angle of the digital camera 200 detected by the accelerator sensor 254 is also displayed. The display position of the camera reference line 331 is fixed on the display screen of the display unit 228 regardless of the attitude of the camera, and is always displayed in parallel to the left-right direction of the digital camera 200. The gravity reference line 332 indicates an angle of the horizontal direction based on gravity (the direction perpendicular to gravity) with respect to the left-right direction of the digital camera 200. According to the present embodiment, an angle of the horizontal direction is an angle in a direction around an optical axis of the digital camera 200. Accordingly, the gravity reference line 332 is a dynamic line whose displayed angle (the angle with respect to the left-right direction of the camera) is updated in accordance with variation of the attitude of the digital camera 200. FIG. 4A shows an example of the case where the angle (hereinafter referred to as horizontal inclination angle A, the horizontal inclination angle A is a rotation angle around an optical axis of the digital camera 200) of the horizontal direction based on gravity (the direction perpendicular to gravity) with respect to the left-right direction of the digital camera 200 is 30°. Accordingly, the angle of the camera reference line 331 with respect to the gravity reference line 332 is 30°.

Further, in the level display on the display unit 228 in the digital camera 200, the elevation/depression angle mark 333 that indicates the elevation or depression angle of the digital camera 200 is also shown. The elevation angle and depression angle refer to the angles (hereinafter referred to a vertical inclination angle C) indicating how much a lens optical axis of the digital camera 200 inclinations with respect to the direction (the horizontal direction) perpendicular to the gravity direction. The angle indicating how much it inclinations upward with respect to the horizontal direction is an elevation angle, and the angle indicating how much it inclinations downward is a depression angle. FIG. 4B shows a state where the optical axis inclinations downward with respect to the horizontal direction. If the lens side of the digital camera 200 inclinations downward with respect to the horizontal direction, the elevation/depression angle mark 333 indicating the elevation angle or the depression angle of the imaging apparatus is displayed above the camera reference line 331.

The display mode of the level display on the display screen of the display unit 228 differs depending on whether the digital camera 200 is held horizontally (in the normal position) or vertically. The position state of the digital camera 200 is determined according to which angle ranges of four states, namely, the normal position, the right vertical position, the left vertical position and the inverted position, the angle detected by the accelerator sensor 254 is included in. If the determined position state is the normal position or the inverted position, the camera reference line 331 is displayed along the left-right direction of the digital camera 200. If the determined position state is the right vertical position (the right side of the back face is in the lower vertical position) or the left vertical position (the left side of the back face is in the lower vertical position), the camera reference line 331 is displayed along the up-down direction of the digital camera 200. Note that the elevation/depression angle mark 333 indicating the elevation angle of the digital camera 200 is displayed to move in the direction perpendicular to the camera reference line 331 in accordance with variation in the elevation and depression angles.

Example of the Display on the PC 100

FIG. 5 shows an exemplary display of a window for displaying the level displayed on the display 105 of the PC 100 connected to the digital camera 200. An operation/display window 310 is a remote live view operation/display screen displayed on the display 105 of the PC 100. Upon the digital camera 200 connected to the PC 100 starting the live view, a live view image is sent from the digital camera 200 to the PC 100, and live view display is performed on a live view display unit 311 in the operation/display window 310.

The camera reference line 319, which is a line (camera reference line 331) indicating the left-right direction of the digital camera 200 in a live view image, is always displayed fixedly in parallel to the left-right direction of the display 105. The gravity reference line 316, which is a line displayed in accordance with the horizontal inclination angle A received from the digital camera 200, is displayed to rotate in accordance with the attitude of the digital camera 200. However, positive and negative of the angle of the gravity reference line 316 with respect to the camera reference line 319 displayed on the display 105 on the PC 100 side have been inverted relative to positive and negative of the angle of the gravity reference line 332 with respect to the camera reference line 331 displayed on the display unit 228 in the digital camera 200. With this configuration, as is understood by putting FIGS. 4A and 5 side by side, the gravity reference line 316 displayed on the display 105 on the PC 100 side appears to agree with the inclination of the digital camera 200. The camera reference line 319 also appears to agree with the horizontal direction based on the gravity (the gravity reference line 332 on the digital camera 200 side). In other words, the gravity reference line 316 appears as the same movement as the change in the inclination of the digital camera 200. Accordingly, a user viewing the display 105 of the PC 100 considers the gravity reference line 316 to be the inclination of the digital camera 200 (rather than a horizontal line based on gravity), and is thus able to intuitively adjust the attitude of the digital camera 200. That is, the gravity reference line 316, which indicates the inclination of the digital camera 200, is neither the actual horizontal line based on gravity nor the line indicating the horizontal direction of the digital camera.

For example, if it is desired to make the attitude of the digital camera 200 horizontal, it is only necessary to move the digital camera 200 such that the gravity reference line 316 agrees with the camera reference line 319. However, since the gravity reference line 316 is displayed with positive and negative of the actual angle being reversed, it is not in conformity with the live view display, which shows the real world. In other words, if the attitude of the digital camera 200 is moved such that the gravity reference line 316 rotates clockwise, a flower base, which is a still object displayed in the live view, rotates anticlockwise. Therefore, it is likely that the level is confusing if it is just superimposed on the live view image and displayed. Accordingly, it is more preferable to guide how to check the gravity reference line by displaying an image simulating the digital camera 200 parallel to the gravity reference line 316. This image simulating the digital camera 200 is variably displayed such that the left-right direction thereof is always parallel to the gravity reference line 316.

A mark 317 is displayed variably in response to the change in the inclination of the digital camera 200 to always keep the angle of 90° with the gravity reference line 316 on a concentric circle around the center of the live view display unit 311. An elevation/depression angle mark 320 displayed on a scale 318 indicates the elevation angle or depression angle of the digital camera 200. The elevation/depression angle mark 320 is displayed such that positive and negative of its position from the camera reference line are opposite to positive and negative of the position of the elevation/depression angle mark 333 from the camera reference line displayed on the display unit 228 in the digital camera 200.

Display buttons 321 and 322 are display buttons for switching the level display. Note that a display button refers to a displayed button that activates a function when clicked with a cursor aligned therewith by mouse operation. Hereinafter, clicking with the cursor aligned with a display button is referred to simply as "pressing" (the display button). Upon the display button 321 being pressed, a level similar to the level displayed on the display unit 228 in the digital camera 200 can be displayed on the live view display unit 311. Thus, display similar to that on the display unit 228 in FIG. 4A is performed on the display 105. Further, upon the display button 322 being pressed, the above-described level display as shown in FIG. 5 is shown.

Autofocus buttons 312 are display buttons for performing auto focus on the digital camera 200 by remote control, and include display buttons such as an ON button and an OFF button. Upon the ON button among the auto focus buttons 312 being pressed, auto focus is performed on the digital camera 200, and upon the OFF button being pressed, auto focus is interrupted. Upon the ON button being operated, the PC 100 notifies the digital camera 200 of a command for instructing focusing. After notifying of the command for instructing focusing, the PC 100 removes the level display (the camera reference line 319, the gravity reference line 316, the mark 317, the scale 318 and the elevation/depression angle mark 320) to facilitate checking of the state of focus. Thus, the display on the live view display unit 311 only shows live view without the level display. After finishing auto focus, the level display is automatically restored on the live view display unit 311. Note that the digital camera 200 may also be configured to remove the level display (the camera reference line 331, the gravity reference line 332 and the elevation/depression angle mark 333) when receiving notification of the command for ordering focusing and performing auto focus.

Upon a white point specification button 314, which is a display button in a click white balance 313, being pressed, a click white balance function is activated. The click white balance function is a function of specifying a white point on the live view display unit 311 using a pointer that can be operated with the mouse and causing the connected digital camera 200 to perform white balance control based on specified coordinates. As the pointer for white point specification, an eye dropper tool (an eye dropper-shaped mouse cursor) is used, for example. After the click white balance function is activated, the level display is removed from the live view display image on the live view display unit 311 similarly to at the time of the above-described auto focus to facilitate white point specification using the eye dropper-shaped cursor. As a result, the display on the live view display unit 311 in the operation/display window 310 only shows the live view without the level display. Then, after the click white balance function is deactivated, the level display on the live view display unit 311 is automatically restored.

In the above-described example, the level display is removed to improve visibility at the time of auto focus and click white balance, but the mode of display is not limited thereto. For example, an alternative display mode where a transmittance of the level display is increased instead of removing the level display to improve the visibility of the live view display may be adopted. Alternatively, the level may be displayed outside of the display area of the live view display.

In the above-described example, the time when auto focus or click white balance is being performed is a condition for removing the level display, but the conditions for removing the level display are not limited thereto. For example, conditions include:

the time when a photographer is performing manual focusing which involves giving a focus drive command from the PC 100 while checking the live view display;

the time when the diaphragm of the digital camera 200 is being stopped down to check a depth of field;

the time when exposure is being checked based on a command to correct the exposure from the PC 100;

the time when an auto-focus frame on the live view display unit 311 is being moved due to user operation; and the case where notification that the digital camera 200 is performing auto focus or stopping down the lens is given.

Operation of the PC 100

Figure 6:
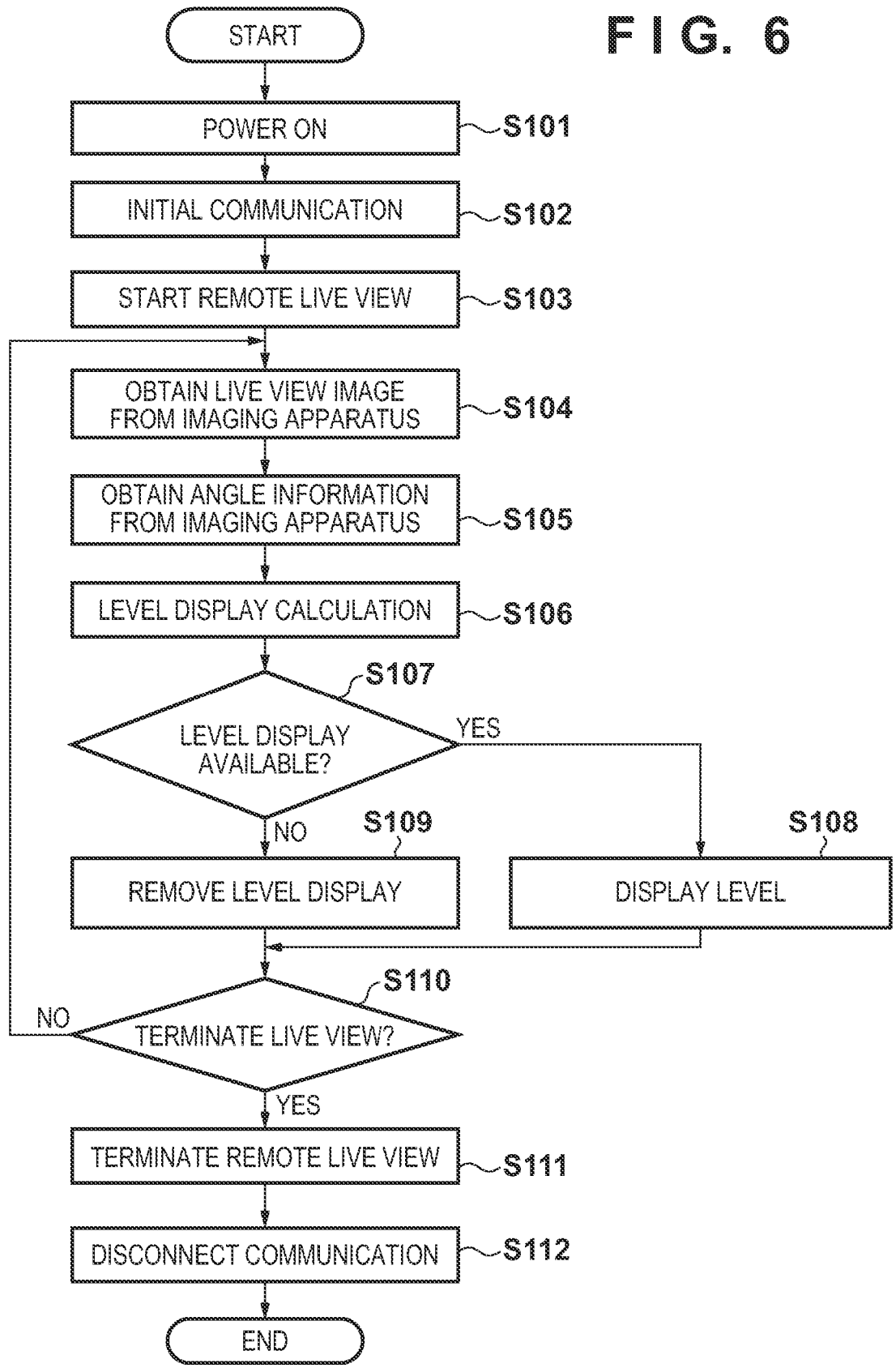
FIG. 6 is a flowchart showing a control procedure of the computer according to the first embodiment.

FIG. 6 shows the flowchart of processing performed on the PC 100 side for displaying the operation/display window 310 for remote live view on the display 105. Note that the processing shown in FIG. 6 is implemented by, for example, the CPU 101 loading the program recorded on the nonvolatile memory 103 into the memory 102 and executing the program.

At step S101, if the PC 100 is operated to turn on its power source, the power source is turned on, and the components of the PC 100 are energized and become operable. Note that it is assumed that the PC 100 is communicably connected to the digital camera 200 at this point.

At step S102, the CPU 101 notifies the digital camera 200 of current setting information on the PC 100 (transmits the current setting information on the PC 100 to the digital camera 200) via the external I/F 109. The setting information notified here is information such as setting information about the shoot mode, setting information about white balance and live view information. The CPU 101 also receives information from the digital camera 200 via the external I/F 109. The information received from the digital camera 200 includes various kinds of setting status, operation mode and the like of the digital camera 200. If the setting status of the digital camera 200 is changed by a photographer, or if settings of the digital camera 200 are changed from the PC 100, the PC 100 is notified of the updated content of such information from the digital camera 200 by the digital camera 200. At step S103, the CPU 101 notifies the digital camera 200 of starting of remote live view. The digital camera 200 starts the live view upon receiving this notification, and transmits information necessary for the remote live view to the PC 100 (which will be described later using FIG. 7).

Figure 7:
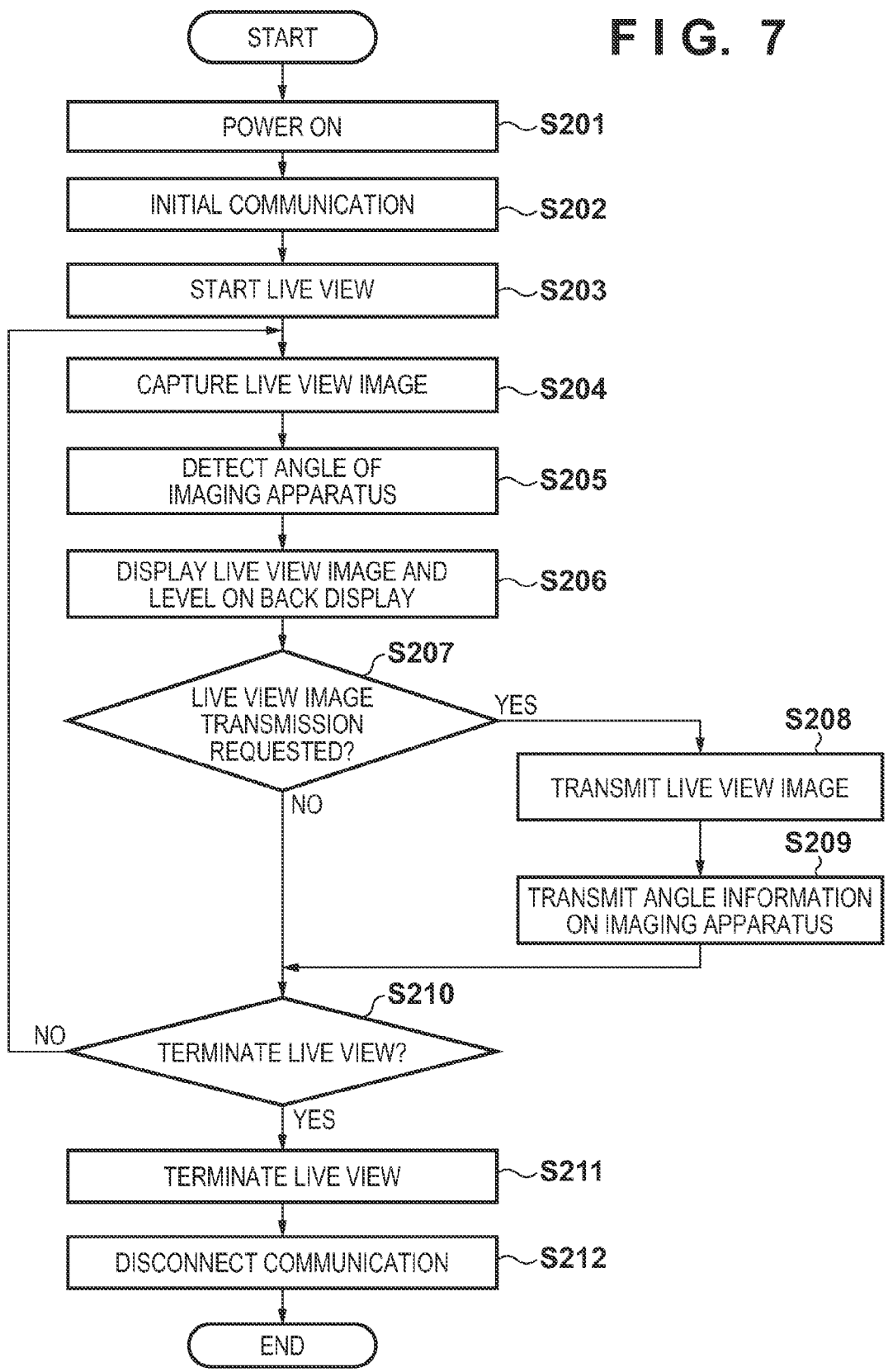
FIG. 7 is a flowchart showing a control procedure of the digital camera according to the first embodiment.

At step S104, the CPU 101 transmits a live view image transmission request to the digital camera 200 at a fixed interval, thereby receiving a live view image from the digital camera 200 at a fixed interval (processing performed in conjunction with S207 to S209 on the camera side shown in FIG. 7). The received live view image is displayed on the live view display unit 311 in the display 105. The live view image on the live view display unit 311 is updated every time the live view image is received from the digital camera 200, and thus the remote live view screen is displayed on the live view display unit 311. At step S105, the CPU 101 obtains angle information associated with the live view image obtained at step S104. The angle information contains information on the horizontal inclination angle A and the vertical inclination angle C, and determination information related to the four position states, namely the normal position, the right vertical position, the left vertical position and the inverted position of the digital camera 200.

At step S106, the CPU 101 performs angle calculation for displaying the level on the live view display unit 311 based on the angle information obtained from the digital camera 200. This angle calculation is now described. The gravity reference line 316 is displayed on the live view display unit 311 at an angle inclinationed from the camera reference line 319 by an angle B, which is obtained by subtracting the horizontal inclination angle A from 360° (B=360–A=–A). Note that 0° is assumed as the same angle as 360°. As a result, the gravity reference line 316 displayed on the live view display unit 311 is displayed such that positive and negative thereof are opposite to positive and negative of the gravity reference line 332 displayed on the display unit 228 in the digital camera 200. In other words, the rotational directions of the gravity reference line 316 and the gravity reference line 332 when the attitude of the digital camera 200 changes are opposite to each other.

Also as for the vertical inclination angle C, an angle D is obtained by subtracting the vertical inclination angle C from 360° (D=360–C), thereby making the positive and negative of the angles C and D opposite to each other. If, for example, the elevation/depression angle mark 320 is displayed within a range of ±90° with the elevation angle 0° being the central position in the remote live view screen within the scale 318 indicating the elevation angle of the digital camera 200, it is displayed as below:

if the angle D is in the range from 0° to 90°, the elevation/depression angle mark 320 is displayed in an upward direction with respect to the center of the remote live view screen;

if the angle D is in the range from 360° to 270°, the elevation/depression angle mark 320 is displayed in a downward direction with respect to the center of the remote live view screen;

if the angle D is in the range from 90° to 180°, the elevation/depression angle mark 320 is displayed in the upward direction with respect to the center of the remote live view screen; and If the angle D is in the range from 180° to 270°, the elevation/depression angle mark 320 is displayed in the downward direction with respect to the center of the remote live view screen.

Note that 0° is assumed as the same angle as 360°. As a result, the elevation/depression angle mark 320 for the digital camera 200 displayed in the remote live view screen on the live view display unit 311 is shown in the upward or downward direction opposite to that of the elevation/depression angle mark 333 displayed on the display unit 228, which is the back display of the digital camera 200. Although in the present embodiment, the central position of the remote live view screen is used an example the elevation angle of 0°, the position of the elevation angle of 0° may alternatively be defined at an arbitrary position in the live view display unit 311.

At step S107, the CPU 101 determines whether or not the conditions under which the level can be displayed on the live view display unit 311 are satisfied. If it is determined that the conditions are satisfied (YES), the processing proceeds to S108, and if it is determined that they are not satisfied (NO), the processing proceeds to step S109. Note that at step S107, if the above-described "conditions for removing the level display" are satisfied, it is determined that the conditions under which the level can be displayed are not satisfied.

At step S108, the CPU 101 performs control for displaying the level such as one described in FIG. 5 on the live view display unit 311 based on the horizontal inclination angle A whose positive and negative have been reversed (i.e., the angle B) and the vertical inclination angle C whose positive and negative have been reversed (i.e., the angle D) calculated at step S106. After step S108 is finished, the processing proceeds to step S110. Meanwhile, at step S109, the CPU 101 removes the level display (or increases the transmittance of the level display), and advances the processing to step S110. At step S110, the CPU 101 determines whether or not an operation to terminate the live view on the digital camera 200 side has been performed or a command given by a user who operated to terminate the remote live view from the PC 100. If it is determined that there has been either of those terminating operations, the processing proceeds to step S111, and if it is determined that there has been none of those terminating operations, the processing returns to step S104.

At step S111, the CPU 101 closes the operation/display window 310, notifies the digital camera 200 of the termination of live view, and terminates the remote live view. Then, at step S111 the CPU 101 disconnects communication.

Operation of the Digital Camera

FIG. 7 shows the flowchart of the operation of the digital camera 200 connected to the PC 100, which is an external device, via the external I/F 255. The operation of the flowchart shown in FIG. 7 is implemented by the system control unit 250 executing the program recorded on the nonvolatile memory 256 and loaded into the system memory 252.

At step S201, if the digital camera 200 is operated to turn on its power, the power is supplied to the components of the digital camera 200 and the components become operative. Note that it is assumed that the digital camera 200 is communicably connected to the PC 100 and in a state capable of outputting a live view image. At step S202, the system control unit 250 performs initial communication to notify the PC 100 of current setting information on the digital camera 200 and receive setting information from the PC 100. The setting information sent from the digital camera 200 to the PC 100 includes a shoot mode setting status, a white balance setting status, a live view status and the like. The setting information on the digital camera 200 is notified if, for example, the setting status of the digital camera 200 is changed by the photographer's operation, if settings of the digital camera 200 are changed based on a command from the PC 100, or the like. At step S203, the system control unit 250, upon receiving an order command to start the remote live view from the PC 100, starts the live view.

At step S204, the system control unit 250 captures a live view image. The captured live view image is sequentially updated and displayed on the display unit 228. At step S205, the system control unit 250 obtains angle information on three axes, namely the X, Y, and Z axes of the digital camera 200 detected by the accelerator sensor 254. Thus the horizontal inclination angle A and the vertical inclination angle C of the digital camera 200 are obtained. At step S206, the system control unit 250 determines, based on the angle information obtained from the accelerator sensor 254, which of the four states, namely the normal position, the right vertical position, the left vertical position and the inverted position the position state of the digital camera 200 is in. Then, the system control unit 250 displays the level in accordance with the determined position state by superimposing the level on the live view image displayed on the display unit 228. The example of this display is as already described with reference to FIG. 4A.

At step S207, the system control unit 250 determines whether or not transmission of the live view image is requested by the PC 100 connected to the digital camera 200. If transmission is requested (YES), the processing proceeds to step S208, and if transmission is not requested (NO), the processing proceeds to step S210. At step S208, the system control unit 250 transmits the live view image to the PC 100. Then, at step S209, the system control unit 250 transmits to the PC 100 the angle information on the digital camera 200 (including the horizontal inclination angle A, the vertical inclination angle C and the position information indicating which of the normal position, the right vertical position, the left vertical position and the inverted position the digital camera 200 is in).

At step S210, it is determined whether or not an operation to terminate the live view has been accepted on the digital camera 200 side, and whether or not a termination command indicating that the user has operated to terminate the remote live view has been accepted by the PC 100. If it is determined that the termination operation or the termination command has been accepted (YES), the processing proceeds to step S211. Meanwhile, if it is determined that none of the termination operation and the termination command has been accepted (NO), the processing returns to step S204, and a live view image is captured again. At step S211, the system control unit 250 terminates the live view display on the display unit 228. Then, at step S212 the system control unit 250 disconnects communication with the PC 100.

As described above, in the level display on the display 105 of the PC 100 in the present embodiment, displayed items (the gravity reference line 316 and the elevation/depression angle mark 320) variably displayed based on the gravity detection are displayed on the PC 100 with their positive and negative being opposite to positive and negative of the level display on the digital camera 200. With this configuration, it seems as if the displayed items variably displayed based on the gravity detection on the display 105 on the PC 100 side agree with the inclination of the digital camera 200. Accordingly, the user viewing the display 105 in the PC 100, who considers the displayed items variably displayed based on the gravity detection to indicate the inclination of the digital camera 200, can easily adjust the attitude of the digital camera 200. In other words, also in the case where display related to the inclination of an imaging apparatus is shown on an external monitor, it becomes easier for a viewer of the external monitor to adjust the attitude of the imaging apparatus as intended.

Note that if the displayed items variably displayed based on the gravity detection are displayed with their positive and negative being opposite to those in the digital camera 200, they are not conformable to the live view display showing the real world, as already described. Accordingly, in some cases it is better not to display the level depending on the content of an image. For example, in the case where an image of an object shown in the live view display contains a picture with which the gravity direction can be easily recognized (e.g., the horizon, a frame of a building and the like), the level display can be rather confusing. Accordingly, the CPU 101 may obtain an image feature value from the live view image obtained from the digital camera 200 and control the level display based on that image feature value. For example, if it is determined that the live view image is by itself an image with which the gravity direction can be easily recognized, the level is not displayed, or
the same level as one displayed on the display unit 228 in the digital camera 200 is displayed, or
the level is displayed with its positive and negative being reversed in a position other than the live view display unit 311, that is, outside of the live view image display area, such that the level is not superimposed on the live view image.

Note that various methods for determining, based on the image feature value, an image with which the gravity direction can be easily recognized are conceivable. For example, it is conceivable to detect an edge from the live view image and determine that the image is one with which the gravity direction can be easily recognized if the edge contains a large amount of linear edge portions (if the amount of edge determined to be linear exceeds a predetermined threshold).

Further, when the displayed items variably displayed based on the gravity detection are displayed with their positive and negative being opposite to those in the digital camera 200, the displayed items may be displayed always such that the level is not superimposed on the live view image. In other words, the level may be displayed always with its positive and negative being reversed in a position other than the live view display unit 311.

Second Embodiment

In the second embodiment, the processing for displaying the displayed items with their positive and negative being reversed, which is performed on the PC 100 side in the first embodiment, is performed on the digital camera 200 side, and the digital camera 200 outputs a different level display depending on the output destination. In other words, a picture with the conventional level display is output as a video output to the back monitor (the display unit 228) of the digital camera 200, and a picture with the level display with its positive and negative being reversed is output to the external I/F 255.

Hereinafter, an automatic control method for the level display in the digital camera 200 connected to an external monitor (e.g., the PC 100) via an external interface 238 is described. The level display and the live view image display are shown on the external monitor connected to the digital camera 200. The digital camera 200, upon detecting connection with the external monitor, creates a level display for the external monitor (in the present embodiment, a level display in which positive and negative of the rotational and moving directions of the displayed items are inverted), superimposes this level display on the live view image, and outputs it to the external monitor. The PC 100, which is the external monitor, displays the level display received from the digital camera 200 on the live view display unit 311.

FIG. 8 is a level display control flowchart in the second embodiment. Note that the operation of the flowchart shown in FIG. 8 is implemented by the system control unit 250 executing the program recorded on the nonvolatile memory 256 and loaded into the system memory 252. Note that the digital camera 200 is connected to the PC 100 via the external I/F 255.

At step S301, if the digital camera 200 is operated to turn on its power, the power is supplied to the components of the digital camera 200, and the components become operative. At step S302, the system control unit 250 starts live view in response to a command to start the live view given by photographer's operation. At step S303, the system control unit 250 captures a live view image. At step S304, the system control unit 250 obtains angle information on three axes, namely the X, Y, and Z axes of the digital camera 200 detected by the accelerator sensor 254. At step S305, the system control unit 250 determines, based on the angle information obtained from the accelerator sensor 254, which of four states, namely the normal position, the right vertical position, the left vertical position and the inverted position the position state of the digital camera 200 is in. Then, the system control unit 250 displays the level in accordance with the determined position state by superimposing the level on the live view image displayed on the display unit 228. The example of this display is as already described with reference to FIG. 4A.

At step S306, the system control unit 250 determines whether or not the external I/F 255 in the digital camera 200 is connected to the external I/F 109 in the PC 100. If it is determined that it is connected (YES), the processing proceeds to step S307, and if it is determined that it is not connected (NO), the processing proceeds to step S309. At step S307, the system control unit 250 performs angle calculation for displaying the level on the external monitor based on the angle information obtained by the accelerator sensor 254, and generates the level display using the obtained angle. More specifically the same angle calculation as at step S106 in FIG. 6 is performed and the level display for the external monitor is generated by rendering the displayed items according to the calculation result. In other words, the gravity reference line is rendered based on the angle B whose positive and negative are opposite to positive and negative of the horizontal inclination angle A using the angle information obtained by the accelerator sensor 254, and the elevation/depression angle mark is rendered based on the angle D whose positive and negative are opposite to positive and negative of the vertical inclination angle C. At step S308, the system control unit 250 generates an image obtained by superimposing the level display generated at step S307 on the live view image, and transmits it to the PC 100. Note that the live view image and the level display image may be sent as separate images.

At step S309, the system control unit 250 determines whether or not an operation to terminate the live view has been accepted by the digital camera 200, or whether or not a notification of an operation to terminate the remote live view has been accepted from the PC 100. If it is determined that the termination operation or the termination notification has been accepted (YES), the processing proceeds to step S310. Meanwhile, if it is determined that neither the termination operation nor the termination notification has been accepted (NO), the processing returns to step S303 and a live view image is captured again. At step S310, the system control unit 250 terminates the live view on the digital camera 200.

Note that it may be determined whether or not the level display is superimposed on the live view image at steps S307 and S308 with such determination as described at steps S107 to S109 in FIG. 6. Further, the above-described respective control of the CPU 101 and the system control unit 250 may be performed by a single piece of hardware, or may be assigned to a plurality of pieces of hardware to control the entire apparatus. Further, in the above-described embodiments, the level is simultaneously displayed with the live view image or displayed by superimposing the level on the live view image in the PC 100, but the live view image display may be omitted and only the level may be displayed in the PC 100.

As described above, according to each of the above-described embodiments, when a level is displayed on an external monitor such as a display of a computer connected to an imaging apparatus, the level displayed on the external monitor is displayed to move in a direction opposite to the moving direction of a level displayed on a back display of the imaging apparatus. Therefore, a photographer can more intuitively perform an operation to adjust a composition as intended by moving the imaging apparatus while viewing the computer display or the external monitor.

Although the present invention has been described in detail based on its preferable embodiments, the present invention is not limited to those specific embodiments, but also embraces various modes within the scope that does not depart from the gist of the present invention. Furthermore, each of the above-described embodiments only indicates one embodiment of the present invention, and those embodiments may also be combined as appropriate.

Furthermore, in the above-described embodiments, the examples of applying the present invention to a digital camera and a personal computer connected to the digital camera have been described. However, the present invention is not limited to those examples. For example, the present invention can be applied to any display control apparatuses capable of performing display based on attitude information on an imaging apparatus. Specifically, the present invention can be applied to a personal computer, a PDA, a mobile phone, a portable image viewer, a printing apparatus provided with a display, a digital photo frame, a music player, a game player, an electronic book reader and the like.

According to the present invention, even when a display related to an inclination of an imaging apparatus is displayed on an external monitor, a viewer of the external monitor can easily adjust the attitude of the imaging apparatus as intended.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-167440, filed Jul. 29, 2011, which is hereby incorporated by reference herein in its entirety.

What is claimed is:

1. A system in which an imaging apparatus is connected to a display control apparatus that controls a second display unit, the imaging apparatus comprising:
   a detection unit configured to detect an inclination of the imaging apparatus;
   a first display unit configured to display an image captured by the imaging apparatus; and
   a first display control unit configured to cause a reference line indicating a horizontal or vertical direction to be displayed together with the image displayed on the display unit, the first display control unit causing the reference line rotated in accordance with the inclination of the imaging apparatus detected by the detection unit to be displayed, the display control apparatus comprising:
an obtaining unit configured to obtain information on the inclination of the imaging apparatus and the image captured by the imaging apparatus; and
a second display control unit configured to cause a reference line rotated in accordance with the information on the inclination of the imaging apparatus to be displayed on the second display unit together with the image captured by the imaging apparatus,
on the second display unit so as to be rotated in an opposite direction to a rotational direction of the reference line to be displayed on the first display unit.

2. The system according to claim 1,
wherein the first display control unit causes a reference line to be displayed, the reference line being obtained by rotating a camera reference line indicating a horizontal or vertical direction of a body of the imaging apparatus in a first direction in accordance with the information on the inclination, and
the second display control unit causes a reference line to be displayed, the reference line being obtained by rotating the camera reference line in a second direction opposite to the first direction in accordance with the information on the inclination.

3. The system according to claim 1,
wherein the first display control unit causes a gravity reference line indicating a horizontal or vertical direction based on gravity to be displayed as the reference line, and
the second display control unit causes a reference line that is neither the gravity reference line indicating the horizontal or vertical direction based on gravity nor a camera reference line indicating the horizontal or vertical direction of the body of the imaging apparatus to be displayed.

4. The system according to claim 1,
wherein the first display control unit and the second display control unit cause a camera reference line indicating the horizontal or vertical direction of the body of the imaging apparatus to be displayed together with the reference line.

5. The system according to claim 1,
wherein the display control apparatus further comprises a live view image obtaining unit configured to obtain a live view image from the imaging apparatus, and
the second display control unit causes the reference line to be displayed together with the image obtained by the live view image obtaining unit.

6. The system according to claim 5,
wherein the second display control unit causes the reference line to be displayed so as to be superimposed on the image obtained by the live view image obtaining unit.

7. A display control apparatus communicably connected to an imaging apparatus including a display unit that displays a captured image, the imaging apparatus detecting an inclination of the imaging apparatus, and causing a reference line indicating a horizontal or vertical direction to be rotated based on the detected inclination and displayed together with the captured image on the display unit,
the display control apparatus comprising:
an obtaining unit configured to obtain information on the inclination of the imaging apparatus and the image captured by the imaging apparatus; and
a display control unit configured to perform control for causing the image captured by the imaging apparatus and a reference line rotated based on the information on the inclination obtained by the obtaining unit to be displayed on a display unit in the display control apparatus,
wherein the display control unit causes the reference line to be displayed, the reference line being rotated in an opposite direction to the rotational direction of the reference line displayed on the display unit in the imaging apparatus.

8. A display control apparatus that is connected to an imaging apparatus including a first display unit configured to display a display item rotated in accordance with an inclination of the imaging apparatus, the display control apparatus comprising:
an obtaining unit configured to obtain an inclination of the imaging apparatus; and
a display control unit configured to display a display item rotated in accordance with inclination of imaging apparatus on a second display unit,
wherein the display control unit causes the display item to be displayed, the display item being rotated in an opposite direction to the rotational direction of the display item displayed on the first display unit in the imaging apparatus.

9. The apparatus according to claim 8,
wherein the obtaining unit further obtains a live view image from the connected imaging apparatus, and
the display control unit causes the display item to be displayed so as to be superimposed on the live view image.

10. The apparatus according to claim 9,
wherein the display control unit obtains an image feature value from the live view image obtained by the obtaining unit, and controls, based on the obtained image feature value, whether or not to perform display of the display item.

11. The apparatus according to claim 8,
wherein the obtaining unit further obtains a live view image from the connected imaging apparatus, and
the display control unit causes the live view image to be displayed, and also causes the display item to be displayed outside of a display area of the live view image.

12. The apparatus according to claim 8,
wherein the obtaining unit further obtains an operation state of the connected imaging apparatus, and
the display control unit removes the display item or increases a transmittance of the display of the display item while the connected imaging apparatus is performing a predetermined operation.

13. A method for controlling a system in which an imaging apparatus is connected to a display control apparatus that controls a second display unit,
the method comprising, in the imaging apparatus;
a detecting step of detecting an inclination of the imaging apparatus;
a first displaying step of displaying an image captured by the imaging apparatus; and
a first display control step of causing a reference line indicating a horizontal or vertical direction to be displayed together with the image displayed in the displaying step, the first display control step comprising causing the reference line rotated in accordance with the inclination of the imaging apparatus detected in the detecting step to be displayed,
and comprising, in the display control apparatus;
an obtaining step of obtaining information on the inclination of the imaging apparatus and the image captured by the imaging apparatus; and
a second display control step of causing a reference line rotated in accordance with the information on the inclination of the imaging apparatus to be displayed on the second display together with the image captured by the imaging apparatus, wherein in the second display control step, the reference line is caused to be displayed so as to be rotated in an opposite direction to a rotational direction of the reference line displayed in the first display control step.

14. A method for controlling a display control apparatus communicably connected to an imaging apparatus including a display unit that displays a captured image, the imaging apparatus detecting an inclination of the imaging apparatus, and causing a reference line indicating a horizontal or vertical direction to be rotated based on the detected inclination and displayed together with the captured image on the display unit, the control method of a display control apparatus comprising:

an obtaining step of obtaining information on the inclination of the imaging apparatus and the image captured by the imaging apparatus; and a display control step of performing control for causing the image captured by the imaging apparatus and a reference line rotated based on the information on the inclination obtained in the obtaining step to be displayed on a display unit in the display control apparatus, wherein in the display control step, the reference line rotated in an opposite direction to a rotational direction of the reference line displayed on the display unit in the imaging apparatus is caused to be displayed.

15. A non-transitory computer-readable recording medium storing a program for causing a computer to execute each of the steps in the control method according to claim 14.

16. A method for controlling a display control apparatus that is connected to an imaging apparatus including a first display unit configured to display a display item rotated in accordance with an inclination of the imaging apparatus, the method comprising:

an obtaining step of obtaining an inclination of the imaging apparatus; and a display control step of displaying a display item rotated in accordance with inclination of imaging apparatus on a second display unit wherein the display control step causes the display item to be displayed, the display item being rotated in an opposite direction to the rotational direction of the display item displayed on the display unit in the imaging apparatus.

17. A non-transitory computer-readable recording medium storing a program for causing a computer to execute each of the steps in the control method according to claim 16.

* * * * *